(12) United States Patent
Choi

(10) Patent No.: US 11,858,322 B2
(45) Date of Patent: Jan. 2, 2024

(54) FRAME STRUCTURE OF VEHICLE

(71) Applicants: HYUNDAI MOTOR COMPANY, Seoul (KR); Kia Corporation, Seoul (KR)

(72) Inventor: Je-Won Choi, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 181 days.

(21) Appl. No.: 17/529,828

(22) Filed: Nov. 18, 2021

(65) Prior Publication Data
US 2022/0194189 A1    Jun. 23, 2022

(30) Foreign Application Priority Data
Dec. 18, 2020    (KR) .................. 10-2020-0178595

(51) Int. Cl.
*B60J 5/04*    (2006.01)
*B60R 13/04*    (2006.01)
*B60R 13/02*    (2006.01)

(52) U.S. Cl.
CPC .......... *B60J 5/0468* (2013.01); *B60J 5/0402* (2013.01); *B60R 13/0243* (2013.01); *B60R 13/04* (2013.01); *B60Y 2304/03* (2013.01); *B60Y 2306/09* (2013.01)

(58) Field of Classification Search
CPC ...... B60J 5/0468; B60J 5/0402; B60J 5/0406; B60Y 2306/09
USPC .................................................... 296/146.2
See application file for complete search history.

(56) References Cited

U.S. PATENT DOCUMENTS

| | | | | |
|---|---|---|---|---|
| 8,955,901 B2* | 2/2015 | Yamada | ................. | B21D 19/08 49/502 |
| 9,821,640 B2* | 11/2017 | Sakurai | ................. | B60J 5/0468 |
| 9,963,088 B2* | 5/2018 | Yoshida | ................. | B60J 10/265 |
| 11,584,202 B2* | 2/2023 | Kimura | ................. | B60J 5/0468 |
| 11,679,650 B2* | 6/2023 | Kimura | ................. | B60J 5/0404 49/404 |
| 2002/0008094 A1* | 1/2002 | Briand | ................. | B23K 28/02 219/121.64 |
| 2015/0183306 A1* | 7/2015 | Shimizu | ................. | B60J 5/0443 296/146.6 |
| 2016/0083016 A1* | 3/2016 | Imada | ................. | B62D 25/04 296/203.01 |
| 2017/0144515 A1* | 5/2017 | Makita | ................. | B60J 5/0402 |
| 2020/0070636 A1* | 3/2020 | Matsumura | ............ | B60J 10/45 |

(Continued)

FOREIGN PATENT DOCUMENTS

KR    10-2014-0055752 A    5/2014

*Primary Examiner* — Jason S Morrow
(74) *Attorney, Agent, or Firm* — Morgan, Lewis & Bockius LLP

(57) ABSTRACT

A frame structure of a vehicle includes: a first member composed of a metal plate, and a second member composed of a metal plate having a thickness thinner than that of the first member, the second member integrally connected to the first member by welding. The connection portion between the first member and the second member has an inclined surface configured to obliquely connect an upper surface of the first member and an upper surface of the second member such that the upper surface of the second member is positioned to be lowered than the upper surface of the first member in a gradual manner.

18 Claims, 13 Drawing Sheets

(56) References Cited

U.S. PATENT DOCUMENTS

| | | | |
|---|---|---|---|
| 2021/0260971 A1* | 8/2021 | Hatta | B60J 5/0402 |
| 2022/0258283 A1* | 8/2022 | Schmale | C22C 38/22 |
| 2023/0001511 A1* | 1/2023 | Alber | B23K 26/24 |
| 2023/0111725 A1* | 4/2023 | Shi | C22C 38/48 |
| | | | 420/8 |

* cited by examiner

FRAME STRUCTURE OF VEHICLE

CROSS-REFERENCE TO RELATED APPLICATION

This application claims the benefit of priority to Korean Patent Application No. 10-2020-0178595, filed on Dec. 18, 2020 in the Korean Intellectual Property Office, which is incorporated herein by reference in its entirety.

TECHNICAL FIELD

The present disclosure relates to a frame structure of a vehicle capable of reducing the weight and improving the rigidity.

BACKGROUND

A frame of a vehicle is generally formed by processing a metal plate, and bonding the processed metal plate.

For example, referring to FIG. 1, which shows a structure of a door frame applied to a door assembly of the vehicle, there is a method for manufacturing a door frame 130 of a door assembly 100 by bonding a separated piece by welding. That is, a quadrant reinforce frame 131, a B pillar frame 132 (Here, B pillar frame is a frame adjacent to the B pillar at the door assembly), a roof frame 133, and an inner belt rail 134 are individually processed, respectively, and then bonded by welding. Each of the metal plates having different thicknesses and materials is first processed to have the rigidity required by the quadrant reinforce frame 131, the B pillar frame 132, the roof frame 133, and the inner belt rail 134, and then the door frame 130 is manufactured by bonding the quadrant reinforce frame 131, the B pillar frame 132, the roof frame 133, and the inner belt rail 134 by welding.

However, the distribution for each piece occurs in the process of individually manufacturing the quadrant reinforce frame 131, the B pillar frame 132, the roof frame 133, and the inner belt rail 134, and the assembly distribution occurs in the process of welding the quadrant reinforce frame 131, the B pillar frame 132, the roof frame 133, and the inner belt rail 134. As such distributions are accumulated, there is a problem in that there occurs the quality problem such as the poor gap step, the introduction of the wind sound or the road noise into the indoor, or the reduction in the water-tightness. That is, as illustrated in FIGS. 2 and 3, a glass run 150 is fitted into the door frame 130 and an inner panel 120, and the wind sound or the road noise is introduced into the indoor due to a space (S) formed between the step formed on the door frame 130 side and the glass run 150, and moisture penetrates into the space (S) formed, thereby lowering the water-tightness performance.

As illustrated in FIG. 4, a door frame 230 of a door assembly 200 is manufactured as one piece, and then may be manufactured by adding and welding a reinforcement member to some sections thereof. The door frame 230 is formed of the metal plate having the same material and the same thickness, and then by welding the reinforcement member such as a quadrant reinforce frame 231 or a latch reinforce frame 232 to reinforce the rigidity of the door frame 230, the door frame 230 is manufactured.

However, in this case, since the matching of the reinforcement member is not complete, the reinforcement member may not be applied to the narrow section and the entry of the welding gun is not possible, such that the reinforcement member may not be applied to all sections requiring the reinforcement member. For the improvement in the rigidity, when the thickness of the door frame 230 is increased, there is a problem in that the weight is excessively increased.

The contents described in Description of Related Art are to help the understanding of the background of the present disclosure, and may include what is not previously known to those skilled in the art to which the present disclosure pertains.

SUMMARY OF THE DISCLOSURE

The present disclosure is devised to solve the above problem, and an object of the present disclosure is to provide a frame structure of a vehicle capable of manufacturing each piece with the optimal thickness and material for each section and removing the distribution.

Another object of the present disclosure is to provide a frame structure of a vehicle capable of solving the sealing, the noise introduction, and the like caused by the step for each piece.

A frame structure of a vehicle according to the present disclosure for achieving the objects includes: a first member composed of a metal plate, and a second member composed of a metal plate having a thickness thinner than that of the first member, the second member integrally connected to the first member by welding. The connection portion between the first member and the second member has an inclined surface configured to obliquely connect an upper surface of the first member and an upper surface of the second member such that the upper surface of the second member is positioned to be lowered than the upper surface of the first member in a gradual manner.

The end contacting the first member and a portion adjacent thereto on the second member are the inclined surface.

The height of the inclined surface is a difference between the thicknesses of the first member and the second member.

The upper surface of the first member is molded to be higher than the upper surface of the second member such that the heights of the bottom surfaces of the first member and the second member are the same as each other, a panel member is bonded on the bottom surface of the first member and the bottom surface of the second member, and a paint is filled in a space formed between the first member, the second member, and the panel member.

The inclined surface is formed to connect the upper surface of the first member and the upper surface of the second member.

The first member is one of a quadrant reinforce frame and a B pillar frame configuring a door frame of a door assembly, and the second member is one of a roof frame or an inner belt rail bonded to the quadrant reinforce frame or the B pillar frame.

The first member and the second member are welded by a tailor welded blank (TWB) welding.

A method of manufacturing a frame structure of a vehicle, the method comprising: forming a first member composed of a metal plate; and forming a second member composed of a metal plate having a thickness thinner than that of the first member, the second member integrally connected to the first member by welding, wherein a connection portion between the first member and the second member has an inclined surface, which is configured to obliquely connect an upper surface of the first member and an upper surface of the second member such that the upper surface of the second member is positioned to be lowered than the upper surface of the first member in a gradual manner, and wherein the inclined surface is configured to be integrally connected with the upper surface of the first member and the upper surface of the second member in a way that the upper surface of the first member is higher than the upper surface of the second member.

A frame structure of a vehicle according to another aspect of the present disclosure may include: a first member formed of a metal plate having a thickness thinner than that of the first member, the second member integrally connected to the first member by welding; and a glass run disposed in a portion in which the first member and the second member are connected in a stepwise manner.

A protrusion which protrudes from the surface of the glass run to fill the portion on which the step between the first member and the second member is formed, is formed on the outside of the glass run.

A hollow hole is formed inside the portion of the glass run formed with the protrusion.

The first member is one of a quadrant reinforce frame and a B pillar frame configuring a door frame of a door assembly, and the second member is one of a roof frame or an inner belt rail bonded to the quadrant reinforce frame or the B pillar frame.

The first member and the second member are welded by a tailor welded blank (TWB) welding.

The frame structure of the vehicle according to the present disclosure having the above configuration may achieve the light-weight and exert the sufficient rigidity.

Further, it is possible to reduce the distribution occurring when the frame of the vehicle is manufactured, thereby improving the quality, and to reduce the scrap, thereby saving an amount of the consumed material.

Further, it is possible to reduce the wind sound or the road noise occurring on the step portion between the pieces, and improve the water-tightness performance.

DESCRIPTION OF SPECIFIC EMBODIMENTS

Figure 1:
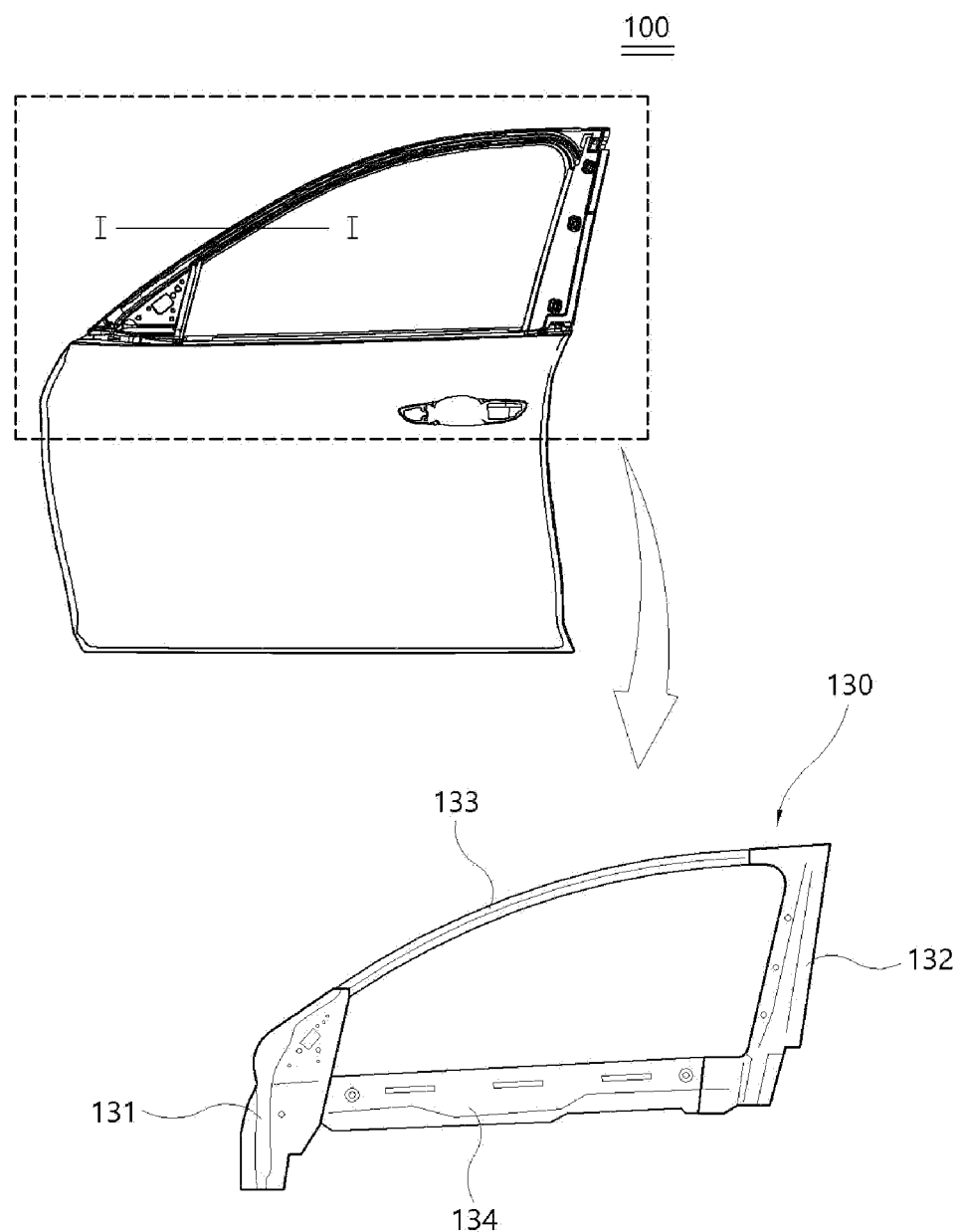
FIG. 1 is a schematic diagram illustrating a frame structure of a vehicle according to the related art.
Figure 2:
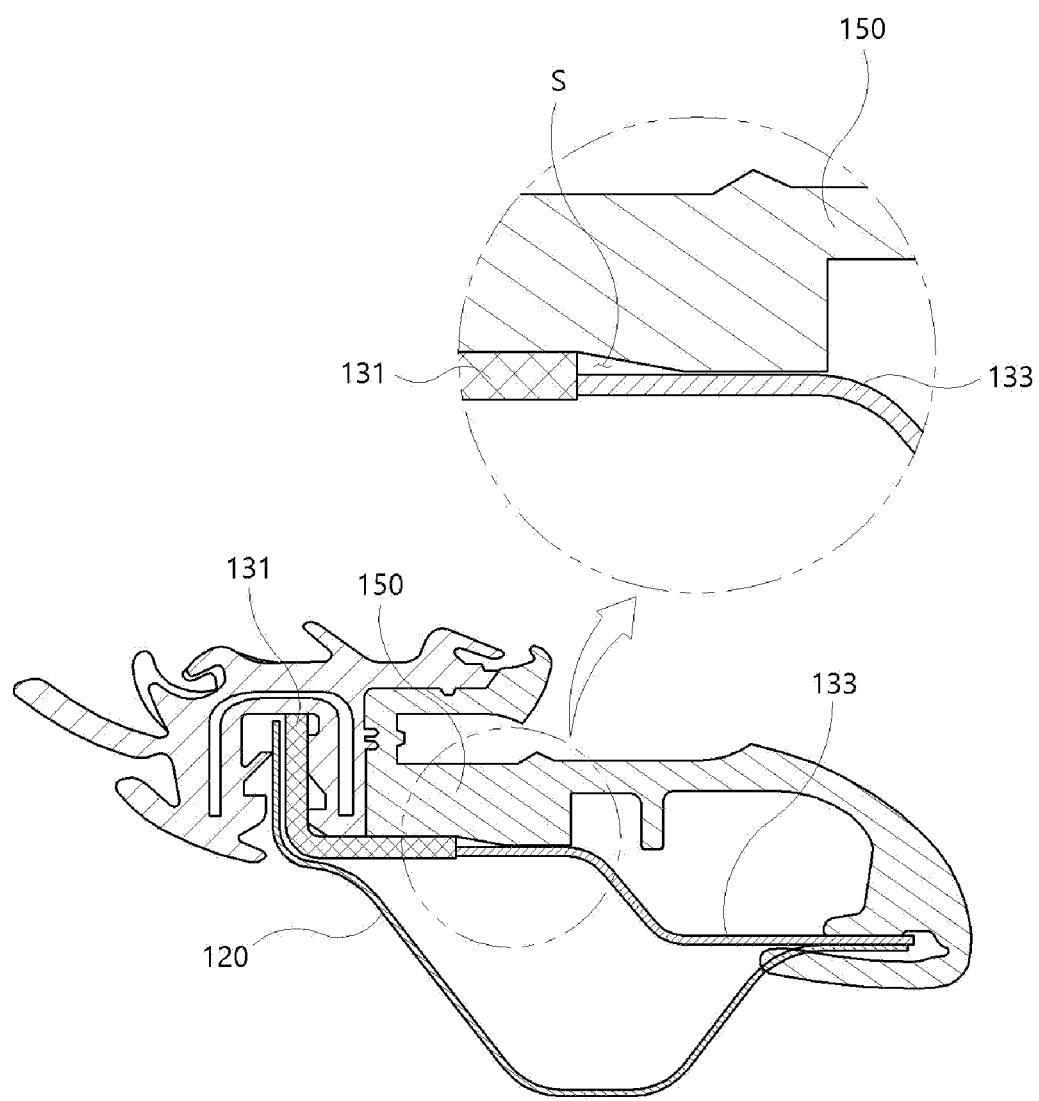
FIG. 2 is a cross-sectional diagram taken along the line I-I illustrated in FIG. 1.
Figure 3:
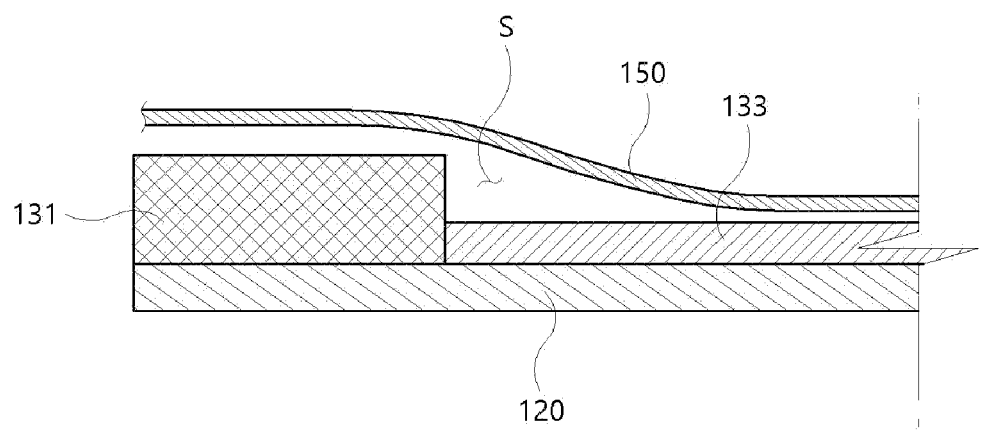
FIG. 3 is a cross-sectional diagram illustrating the state where a space is formed between a door frame and a glass run by the thickness step in the frame structure of the vehicle according to the related art.
Figure 4:
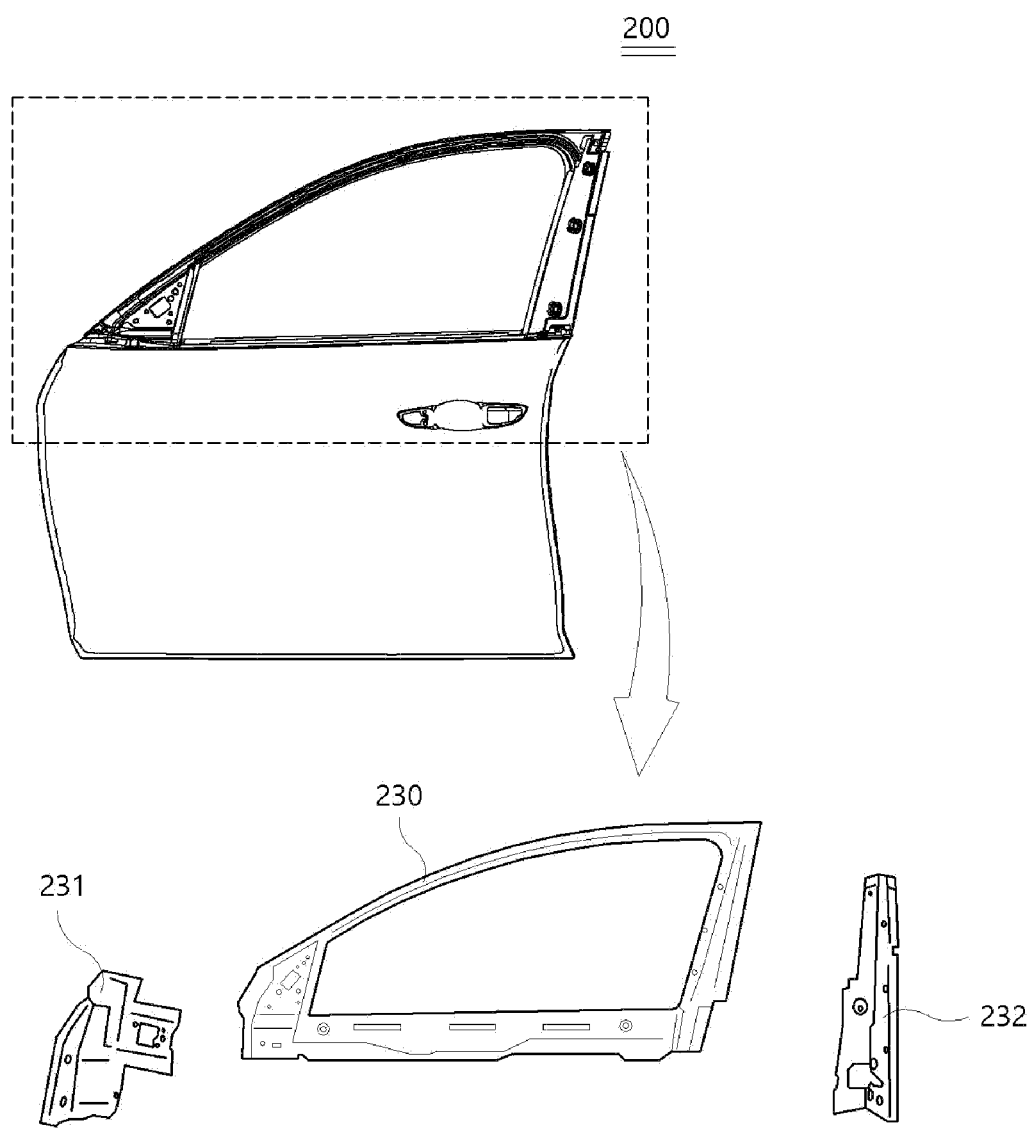
FIG. 4 is a schematic diagram illustrating a frame structure of a vehicle according to another example of the related art.
Figure 5:
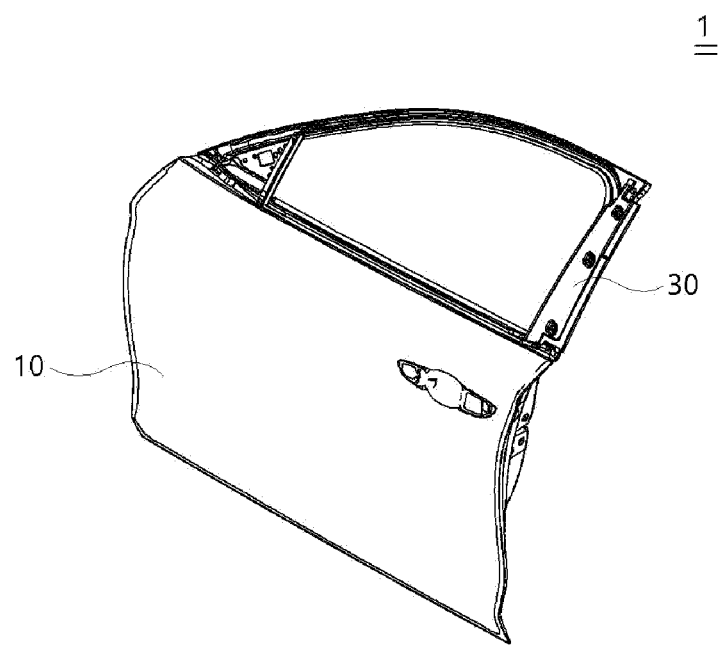
FIG. 5 is a perspective diagram illustrating a door assembly to which a frame structure of a vehicle according to the present disclosure is applied.

Hereinafter, a frame structure of a vehicle according to the present disclosure will be described in detail with reference to the accompanying drawings.

A frame structure of a vehicle according to the present disclosure includes a first member 31 formed of a metal plate, and a second member 33 formed of a metal plate thinner than that of the first member 31 and welded to the first member 31, and an inclined surface 35, which obliquely connects the upper surface of the first member 31 and the upper surface of the second member 33 to be lowered toward the second member 33, is included in a portion in which the first member 31 and the second member 33 are bonded, or the step is filled with a glass run 50.

Here, the cross section of the inclined surface 35 connecting the upper surface of the first member 31 and the upper surface of the second member 33 may be formed in a diagonal line, a curve, or the state of mixing the diagonal line and the curve. Further, a portion adjacent to the inclined surface 35 may be a planar surface parallel to the upper surface of the first member 31 or the upper surface of the second member 33.

Hereinafter, to understand the frame structure of the vehicle according to the present disclosure, a door frame 30 applied to a door assembly 1 of the vehicle will be described as an example.

Figure 6:
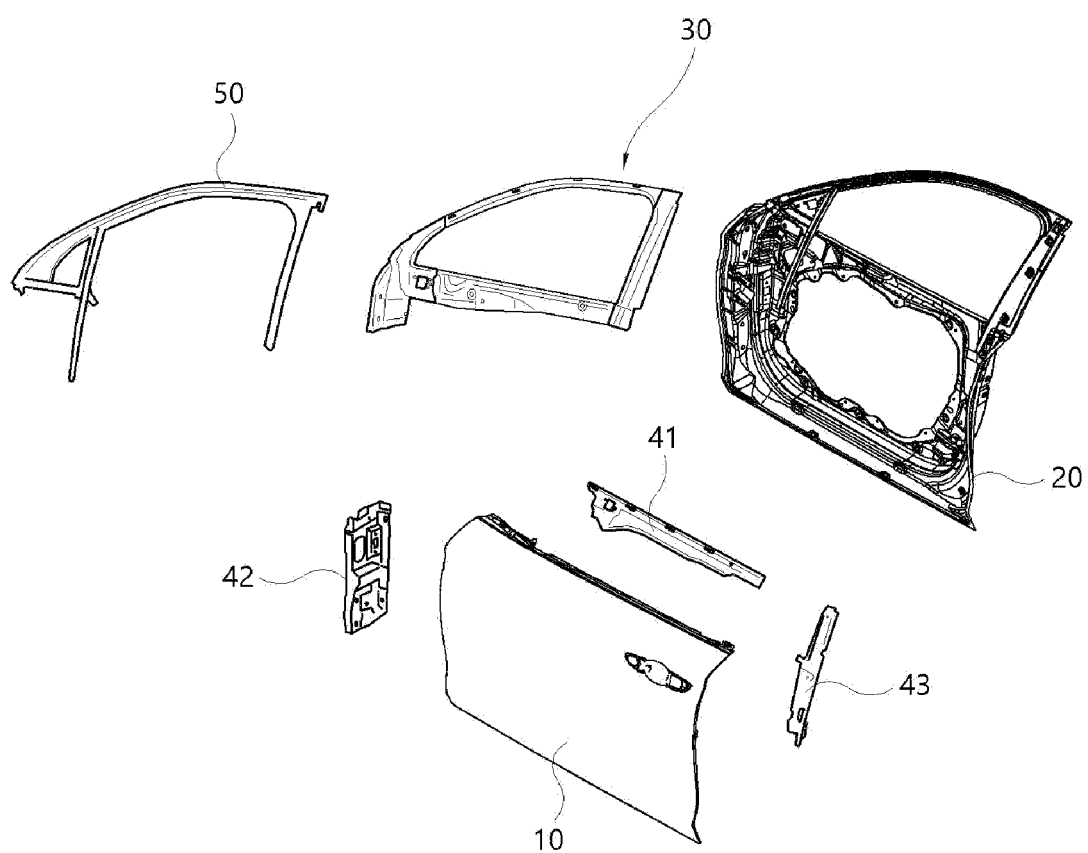
FIG. 6 is an exploded perspective diagram illustrating the door assembly to which the frame structure of the vehicle according to the present disclosure is applied.

As illustrated in FIG. 6, the door assembly 1 is manufactured by coupling an outer panel 10 and an inner panel 20, and for reinforcing the rigidity, a door frame 30, an outer belt rail 41, a hinge reinforce 42, a latch reinforce 43 are fastened, and for the airtightness, the glass run 50 is assembled.

Figure 7:
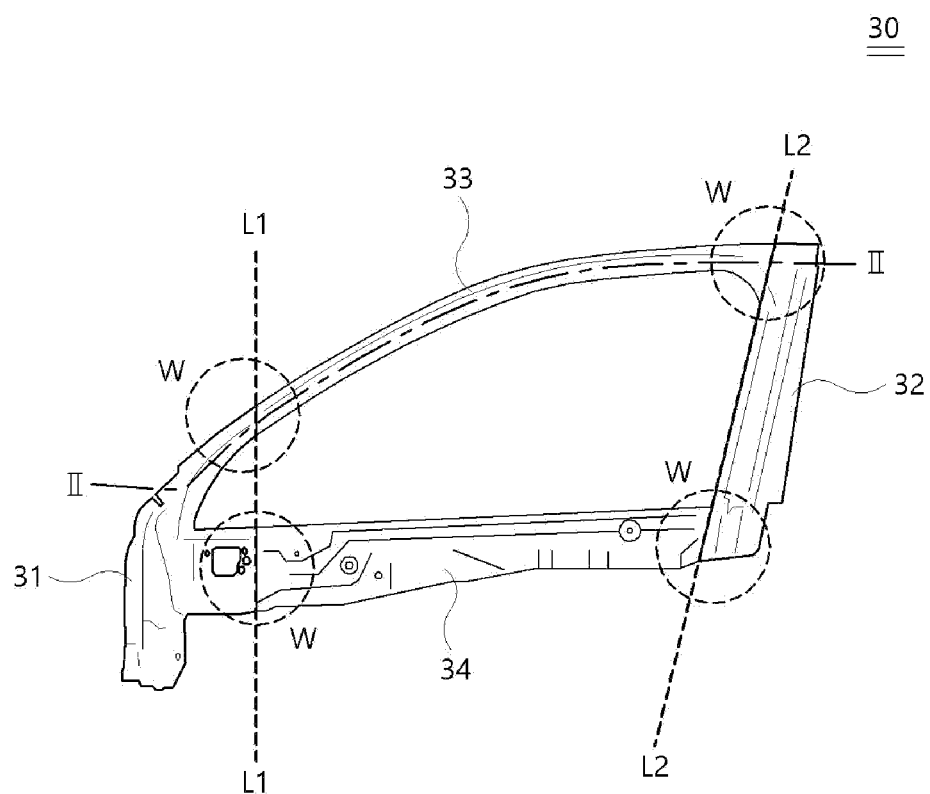
FIG. 7 is a plan diagram illustrating the frame structure of the vehicle according to the present disclosure.

Referring to FIG. 7, the door frame 30 is manufactured by individually manufacturing a quadrant reinforce frame 31, a B pillar frame 32, a roof frame 33, and an inner belt rail 34, respectively, and then bonding a connection portion (W) by welding.

Particularly, according to the present disclosure, each piece configuring the frame may be bonded by welding, and at this time, welds each piece by a tailor welded blank (TWB) welding. Particularly, a TWB laser welding using a laser may be preferable. The TWB welding is a technology of cutting and welding the metal plates having various materials and thicknesses in the required shape. Therefore, the quadrant reinforce frame 31, the B pillar frame 32, the roof frame 33, and the inner belt rail 34 are cut and processed using the metal plates having different thicknesses, and then welded using the TWB laser welding.

Therefore, since the metal plate is cut and then welded by reflecting not only the car-line but also the diagonal or bent line shape according to the shape of the final product, it is possible to maximally use the metal plate, thereby minimizing the occurrence of the scrap. That is, describing the door frame 30 as an example, the quadrant reinforce frame 31 is cut and processed according to each shape of the roof frame 33 and the inner belt rail 34, and then welded, such that the line on which the quadrant reinforce frame 31 is bonded to the roof frame 33 and the inner belt frame 34 is bonded along the perpendicular car-line (see L1-L1 line), and the line on which the B pillar frame 32 is bonded with the roof frame 33 and the inner belt rail 34 is bonded along the diagonal line (see L2-L2 line).

Further, in the cross section illustrated by the II-II line illustrated in FIG. 7, a step occurs due to a thickness difference between the respective members configuring the door frame 30, and problems (the wind sound, the road noise, and the reduction in the watertightness performance) caused by the step occur, and the problems can be solved by forming the portion formed with the step as the inclined surface 35 or filling the space formed by the step. A specific method thereof will be described with reference to each exemplary embodiment to be described later.

Figure 8A:
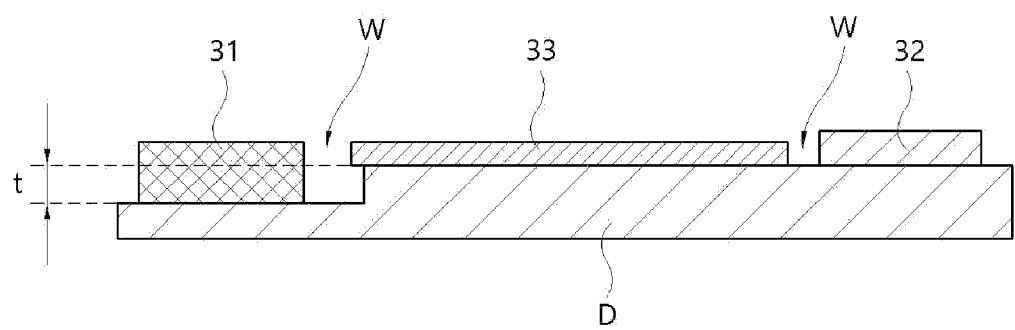
FIGS. 8A to 8C are schematic diagrams illustrating a process of manufacturing a frame structure of a vehicle according to a first exemplary embodiment of the present disclosure.
Figure 8B:
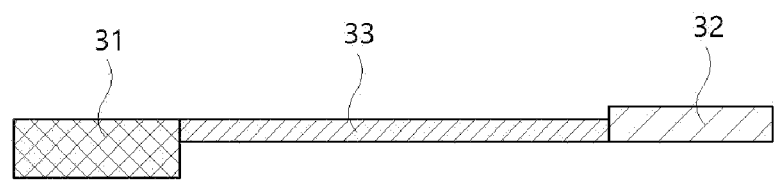
Figure 8C:
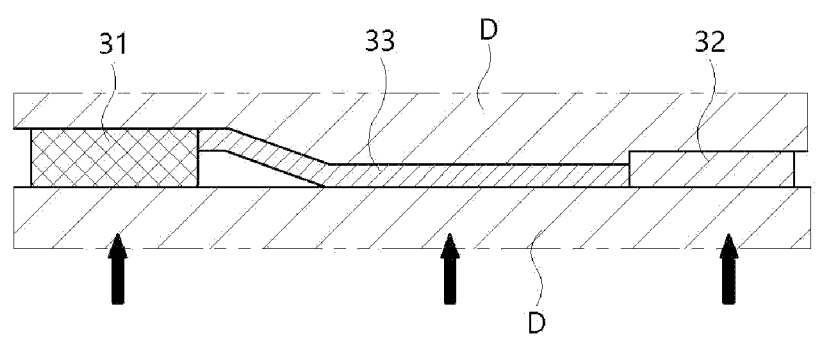

FIGS. 8A to 8C illustrate a frame structure of a vehicle according to a first exemplary embodiment of the present disclosure.

The present exemplary embodiment describes the door frame 30 applied to the door assembly 1, for example, as the frame of the vehicle.

In the frame structure of the vehicle including the first member 31 formed of the metal plate, and the second member 33 formed of the metal plate thinner than that of the first member 31 and welded to the first member 31, the inclined surface 35 is formed by welding the first member 31 and the second member 33, and then molding the first member 31 and the second member 33 in order to form the inclined surface 35 on the portion on which the first member 31 and the second member 33 are bonded.

Here, since the thickness of the first member 31 is larger than the thickness of the second member 33, the door frame 30 will be described by designating the quadrant reinforce frame 31 as the first member 31 and the roof frame 33 as the second member 33. The first member 31 may be the quadrant reinforce frame 31 or the B pillar frame 32 having a relatively larger thickness, and the second member 33 may be the roof frame 33 of the door assembly or the inner belt rail 34, and applied to the bonded portion between the first member and the second member 33.

The quadrant reinforce frame 31 and the roof frame 33 are seated on a die (D) such that the upper surfaces thereof have the same heights (see FIG. 8A). Since the quadrant reinforce frame 31 is thicker than the roof frame 33, the bottom surface of the quadrant reinforce frame 31 is located lower than the bottom surface of the roof frame 33.

Then, a portion in which the quadrant reinforce frame 31 and the roof frame 33 are in contact with each other is welded. The quadrant reinforce frame 31 and the roof frame 33 are welded by the aforementioned tailor welded blank (TWB) method. Further, the quadrant reinforce frame 31 and the roof frame 33 are bonded by the TWB laser welding using the laser as the energy source.

The quadrant reinforce frame 31 and the roof frame 33 are integrated by welding (see FIG. 8B), and then the assembly thereof is set on the die (D), and then the upper surface of the quadrant reinforce frame 31 is molded to be higher than the upper surface of the roof frame 33 (see FIG. 8C). The bottom surface sides of the quadrant reinforce frame 31 and the roof frame 33 are molded using the press such that the upper surface of the quadrant reinforce frame 31 is higher than the upper surface of the roof frame 33.

As described above, when the upper surface of the quadrant reinforce frame 31 is molded to be higher than the upper surface of the roof frame 33 using the press, the end contacting the quadrant reinforce frame 31 and a portion adjacent thereto are molded as the inclined surface 35 on the roof frame 33 having a relatively smaller thickness.

According to the present exemplary embodiment, the height of the inclined surface 35 may be a difference between the thickness of the quadrant reinforce frame 31 and the thickness of the roof frame 33.

Further, the bottom surfaces of the quadrant reinforce frame 31 and the roof frame 33 have the same heights, and a panel member, for example, the inner panel 20 of the door assembly 1 may be bonded on the bottom surface of the quadrant reinforce frame 31 and the bottom surface of the roof frame 33.

At this time, a space (S) surrounded by the quadrant reinforce frame 31, the roof frame 33, and the inner panel 20 is formed, in which the space (S) may be filled with a paint through a painting process. By filling the paint in the space (S), it is possible to prevent the occurrence of the wind sound or the road noise caused by the space (S) and improve the water-tightness performance.

As described above, when the step is prevented from being formed between the quadrant reinforce frame 31 and the roof frame 33 by forming the inclined surface 35 using the press molding after bonding the quadrant reinforce frame 31 and the roof frame 33 using the TWB laser welding, the problems (the wind sound, the road noise, and the reduction in the water-tightness performance) caused by the step may be solved.

Figure 8D:
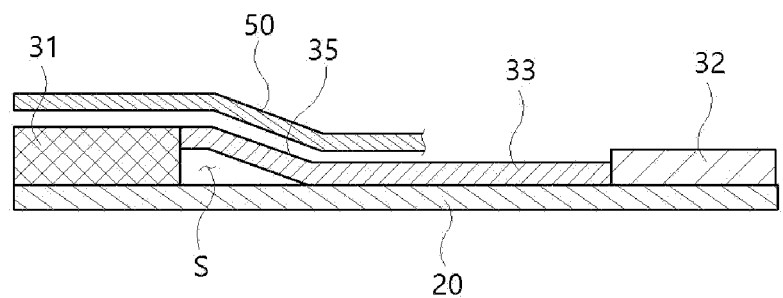
FIG. 8D is a cross-sectional diagram illustrating the frame structure of the vehicle according to the first exemplary embodiment of the present disclosure.

FIG. 8D is a cross-sectional diagram of the state where the glass run 50 is applied to the frame structure of the vehicle according to the first exemplary embodiment of the present disclosure.

Figure 9A:
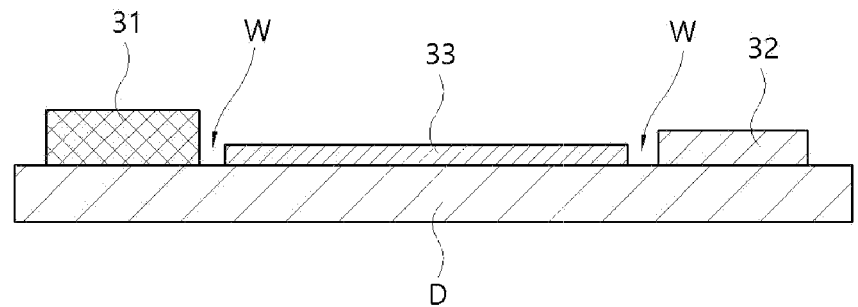
FIGS. 9A to 9C are schematic diagrams illustrating a process of manufacturing a frame structure of a vehicle according to a second exemplary embodiment of the present disclosure.
Figure 9B:
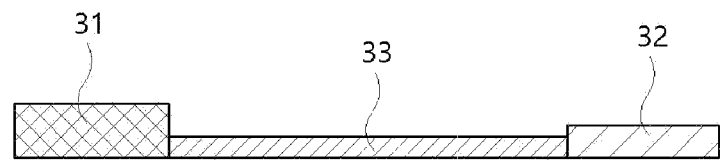
Figure 9C:
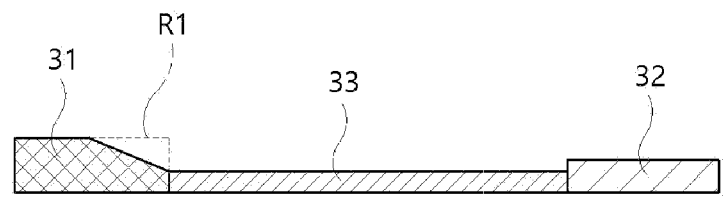

FIGS. 9A to 9C illustrate a frame structure of a vehicle according to a second exemplary embodiment of the present disclosure.

According to the present exemplary embodiment, in the frame structure of the vehicle including the first member 31 formed of the metal plate, and the second member 33 formed of the metal plate thinner than that of the first member 31 and welded to the first member 31, the inclined surface 35 is formed on the portion in which the first member 31 and the second member 33 are bonded.

According to the present exemplary embodiment, the door frame 30 is applied as the frame of the vehicle, and will be described by designating the quadrant reinforce frame 31 as the first member 31 and the roof frame 33 as the second member 33. Likewise, the first member 31 may be the quadrant reinforce frame 31 or the B pillar frame 32 having a relatively larger thickness, and the second member 33 may be the roof frame 33 or the inner belt rail 34.

However, according to the present exemplary embodiment, the inclined surface 35 is formed by obliquely removing a part of the quadrant reinforce frame 31.

First, as illustrated in FIG. 9A, the quadrant reinforce frame 31 and the roof frame 33 are set on the die (D).

Further, the quadrant reinforce frame 31 and the roof frame 33 are bonded using the TWB laser welding. Since the quadrant reinforce frame 31 is thicker than the roof frame 33, a step is formed between the quadrant reinforce frame 31 and the roof frame 33 (see FIG. 9B).

To remove the step and connect the quadrant reinforce frame 31 and the roof frame 33 by the inclined surface 35, a part of the quadrant reinforce frame 31 is removed by grinding on the portion in which the quadrant reinforce frame 31 is in contact with the roof frame 33. For example, when a part of the quadrant reinforce frame 31 is processed by grinding by 'R1' in FIG. 9C, the quadrant reinforce frame 31 and the roof frame 33 are connected by the inclined surface 35.

Figure 9D:
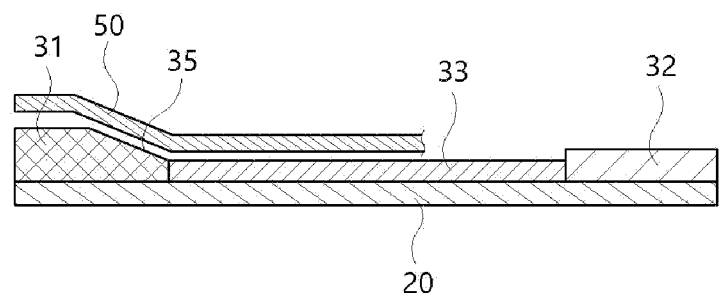
FIG. 9D is a cross-sectional diagram illustrating the frame structure of the vehicle according to the second exemplary embodiment of the present disclosure.

FIG. 9D is a cross-sectional diagram of the state where the glass run 50 is applied to the frame structure of the vehicle according to the second exemplary embodiment of the present disclosure.

As described above, when the step is prevented from being formed between the quadrant reinforce frame 31 and the roof frame 33 by forming the inclined surface 35 by processing a part of the quadrant reinforce frame 31 by grinding after welding the quadrant reinforce frame 31 and the roof frame 33 using the TWB laser welding, it is possible to prevent the wind sound or the road noise from being caused by the step and improve the water-tightness performance.

Figure 10A:
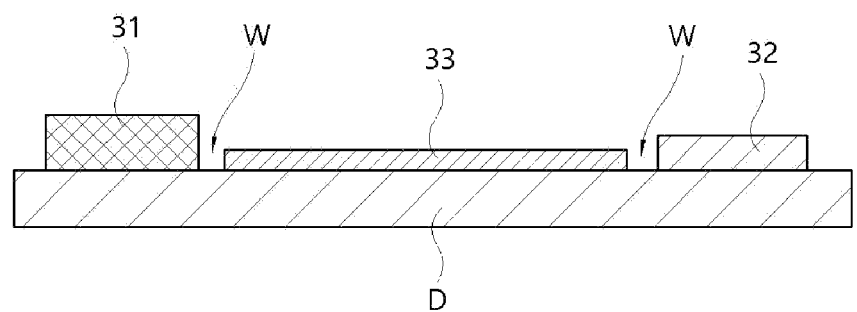
FIGS. 10A to 10C are schematic diagrams illustrating a process of manufacturing a frame structure of a vehicle according to a third exemplary embodiment of the present disclosure.
Figure 10B:
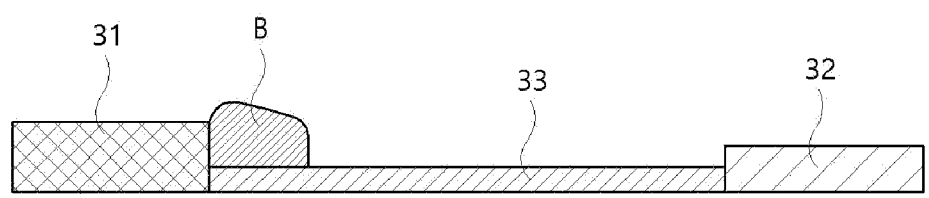
Figure 10C:
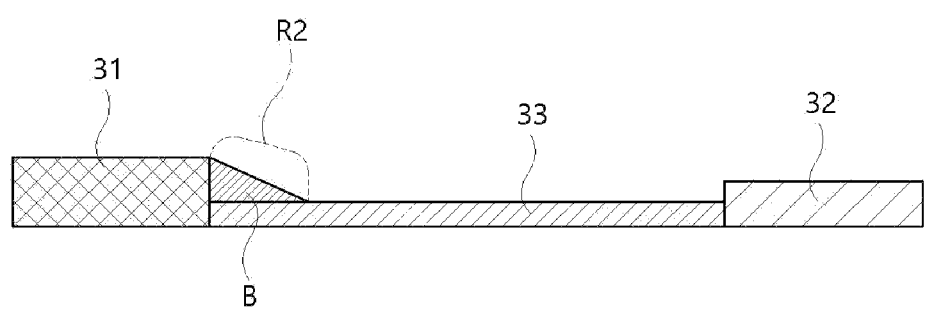

FIGS. 10A to 10C illustrate a frame structure of a vehicle according to a third exemplary embodiment of the present disclosure.

According to the present exemplary embodiment, as in the aforementioned exemplary embodiments, the door frame 30 is applied, for example, as the frame of the vehicle, and will be described by designating the quadrant reinforce frame 31 as the first member 31 and the roof frame 33 as the second member 33. Further, the first member 31 may be the quadrant reinforce frame 31 or the B pillar frame 32 having a relatively larger thickness, and the second member 33 may also be the roof frame 33 or the inner belt rail 34.

According to the present disclosure, a welding bead (B) can be formed between the first member 31 and the second member 33, and a part of the welding bead (B) can be removed such that the inclined surface 35 is formed.

As in the third exemplary embodiment, the quadrant reinforce frame 31 and the roof frame 33 are set on the die (D) (see FIG. 10A). Further, the quadrant reinforce frame 31 and the roof frame 33 are bonded using the TWB laser welding. Since the quadrant reinforce frame 31 is thicker than the roof frame 33, the step is formed between the quadrant reinforce frame 31 and the roof frame 33.

The step between the quadrant reinforce frame 31 and the roof frame 33 is formed with the welding bead (B) by welding (see FIG. 10B). A portion in which the roof frame 33 is in contact with the quadrant reinforce frame 31 is soldered with a flexible material such that the welding bead (B) is formed. Since the welding bead (B) is formed by the soldering, the inclined surface may be easily formed.

Then, as illustrated in FIG. 10C, when the welding bead (B) is removed by 'R2' illustrated in FIG. 10C through the grinding process, the inclined surface is formed between the quadrant reinforce frame 31 and the roof frame 33.

As described above, when the step is prevented from being formed between the quadrant reinforce frame 31 and the roof frame 33 by forming the inclined surface 35 by grinding a part of the welding bead (B) after forming the welding bead (B) on the step between the quadrant reinforce frame 31 and the roof frame 33, the problems (the wind sound, the road noise, and the reduction in the water-tightness performance) caused by the step may be solved.

Figure 10D:
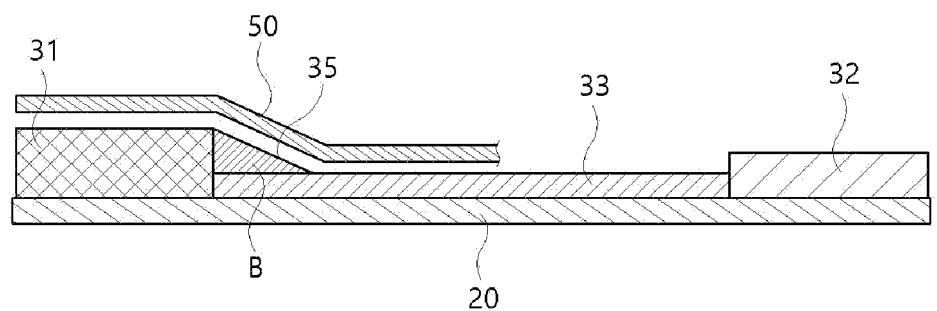
FIG. 10D is a cross-sectional diagram illustrating the frame structure of the vehicle according to the third exemplary embodiment of the present disclosure.

FIG. 10D is a cross-sectional diagram of the state where the glass run 50 is applied to the frame structure of the vehicle according to the third exemplary embodiment of the present disclosure.

Figure 11A:
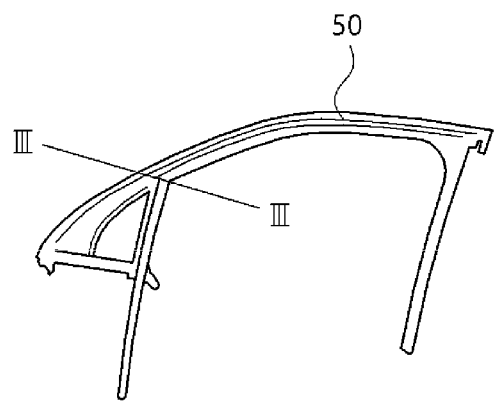
FIG. 11A is a cross-sectional diagram illustrating a frame structure of a vehicle according to a fourth exemplary embodiment of the present disclosure.
Figure 11B:
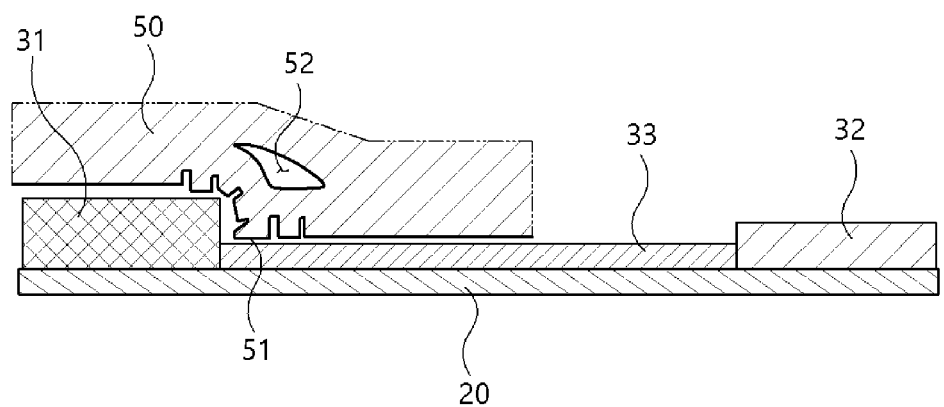
FIG. 11B is a cross-sectional diagram along line III-III of FIG. 11A.
Figure 11C:
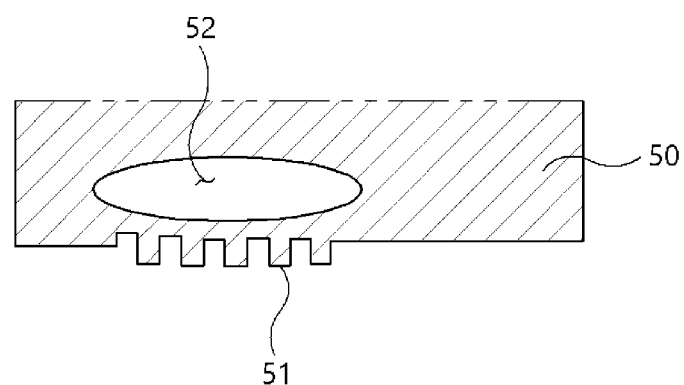
FIG. 11C is a cross-sectional diagram illustrating a glass run applied to the frame structure of the vehicle according to the fourth exemplary embodiment of the present disclosure.

FIGS. 11A to 11C illustrate a frame structure of a vehicle according to a fourth exemplary embodiment of the present disclosure.

According to the present exemplary embodiment, the door frame 30 is applied, for example, as the frame of the vehicle. Further, the door frame 30 will be described by designating the quadrant reinforce frame 31 as the first member 31 and the roof frame 33 as the second member 33. Likewise, the first member 31 may be the quadrant reinforce frame 31 or the B pillar frame 32 having a relatively larger thickness, and the second member 33 may also be the roof frame 33 or the inner belt rail 34.

However, the present exemplary embodiment fills the step formed between the first member 31 and the second member 33, thereby solving the problems caused by the step.

First, as in the second exemplary embodiment or the third exemplary embodiment, the quadrant reinforce frame 31 and the roof frame 33 are welded using the TWB laser welding. The step caused by the difference between the thickness of the quadrant reinforce frame 31 and the thickness of the roof frame 33 exists between the quadrant reinforce frame 31 and the roof frame 33.

The present disclosure solves the problems (introduction of the wind sound and the road noise, the reduction in the water-tightness performance, and the like) caused by the step by filling the step rather than removing the step.

That is, by filling the glass run 50 in the step between the quadrant reinforce frame 31 and the roof frame 33 on the cross section of the portion indicated by the III-III of FIG. 11A line illustrated in FIG. 11B, the problem caused by the step is solved.

Reviewing the glass run 50 for solving the problem, as illustrated in FIG. 11C, protrusions 51 are formed on the surface of the glass run 50. Since the glass run 50 is made of rubber, and the protrusion 51 is formed on the surface of the glass run 50, the space formed by the step between the quadrant reinforce frame 31 and the roof frame 33 is filled by the deformation of the protrusion 51.

Particularly, a hollow hole 52 is formed inside the portion of the glass run 50 in which the protrusion 51 is formed. Since the glass run 50 itself may be easily deformed by the hollow hole 52, it is advantageous to fill the space formed by the step.

As described above, the exemplary embodiments have described the configuration for solving the problems caused by the step formed between the quadrant reinforce frame 31 and the roof frame 33, but may be applied to the step formed between the roof frame 33 and the B pillar frame 32, between the quadrant reinforce frame 31 and the inner belt rail 34, and between the inner belt rail 34 and the B pillar frame 32.

Further, the exemplary embodiments may be applied to each frame configuring the vehicle as well as the door frame 30 of the vehicle.

What is claimed is:

1. A frame structure of a vehicle comprising:
a first member composed of a metal plate; and
a second member composed of a metal plate having a thickness thinner than that of the first member, the second member integrally connected to the first member by welding,
wherein a connection portion between the first member and the second member has an inclined surface, which is configured to obliquely connect an upper surface of the first member and an upper surface of the second member such that the upper surface of the second member is positioned to be lowered than the upper surface of the first member in a gradual manner, wherein the first member and the second member have bottom surfaces, respectively, leveled to each other, wherein the frame structure further includes a panel member configured to be attached to the bottom surface of the first member and the bottom surface of the second member, and wherein the panel member and the connection portion are spaced apart from each other and the first member and the second member are spaced apart from each other, such that a paint is disposed in a space between the first member, the second member, and the panel member.

2. The frame structure of the vehicle of claim 1, wherein the connection portion is configured to connect an end of the first member and a portion of the second member.

3. The frame structure of the vehicle of claim 1, wherein the inclined surface has a height which varies between a height of the first member and a height of the second member.

4. The frame structure of the vehicle of claim 1, wherein the inclined surface is configured to connect the upper surface of the first member and the upper surface of the second member.

5. The frame structure of the vehicle of claim 1, wherein the first member is one of a quadrant reinforce frame and a B pillar frame configuring a door frame of a door assembly, and wherein the second member is one of a roof frame or an inner belt rail bonded to the quadrant reinforce frame or the B pillar frame.

6. The frame structure of the vehicle of claim 1, wherein the first member and the second member are integrally connected to each other by a tailor welded blank (TWB) welding.

7. A frame structure of a vehicle comprising:
a first member composed of a metal plate;
a second member composed of a metal plate having a thickness thinner than that of the first member, the second member integrally connected to the first member by welding; and
a glass run disposed in a portion in which the first member and the second member are connected in a stepwise manner,
wherein the first member and the second member have bottom surfaces, respectively, leveled to each other, and
wherein the frame structure further includes a panel member configured to be attached to the bottom surface of the first member and the bottom surface of the second member.

8. The frame structure of the vehicle of claim 7, further comprising a protrusion protruding from an outer surface of the glass run and extending toward a step between the first member and the second member.

9. The frame structure of the vehicle of claim 8, wherein the glass run has a hole therein.

10. The frame structure of the vehicle of claim 7, wherein the first member is one of a quadrant reinforce frame and a B pillar frame configuring a door frame of the vehicle, and
wherein the second member is one of a roof frame or an inner belt rail bonded to the quadrant reinforce frame or the B pillar frame.

11. A method of manufacturing a frame structure of a vehicle, the method comprising:
forming a first member composed of a metal plate; and
forming a second member composed of a metal plate having a thickness thinner than that of the first member, the second member integrally connected to the first member by welding,
wherein a connection portion between the first member and the second member has an inclined surface, which is configured to obliquely connect an upper surface of the first member and an upper surface of the second member such that the upper surface of the second member is positioned to be lowered than the upper surface of the first member in a gradual manner, and
wherein the inclined surface is configured to be integrally connected with the upper surface of the first member and the upper surface of the second member in a way that the upper surface of the first member is higher than the upper surface of the second member,
wherein the connection portion is integrally attached to an end of the first member contacting an end of the second member.

12. The method of claim 11, wherein the upper surface of the first member is disposed to be higher than the upper surface of the second member by a press processing.

13. The method of claim 11, wherein the connection portion has the inclined surface formed by disposing and welding a bottom surface of the first member and a bottom surface of the second member to be leveled, and then obliquely removing an end portion of the first member.

14. The method of claim 13, wherein a portion of the first member contacting the second member includes the inclined surface formed by grinding.

15. The method of claim 11, wherein the connection portion has the inclined surface formed by disposing and welding a bottom surface of the first member and a bottom surface of the second member to be leveled, forming a welding bead on a bonded portion between the first member and the second member, and obliquely removing a part of the welding bead.

16. The method of claim 15, wherein the connection portion is integrally attached to the upper surface of the second member and has the inclined surface by grinding the welding bead.

17. The method of claim 15, wherein the connection portion is integrally attached to the first member and the second member by soldering the welding bead.

18. The method of claim 11, wherein the first member and the second member are configured to be integrally connected to each other by a tailor welded blank (TWB) welding.

* * * * *